Figure 1:
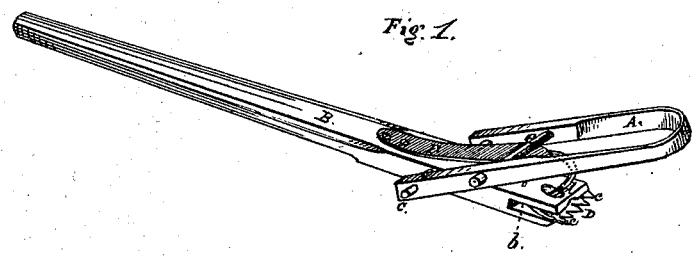

G. Whitbeck,

Horse Poke.

No. 100,827.   Patented Mar. 15, 1870.

Witnesses:
W. K. Sheffer
A. Sweetsford

Inventor:
George Whitbeck
By Ort. Davist Co
Attys

United States Patent Office.

GEORGE WHITBECK, OF PHELPS, NEW YORK.

Letters Patent No. 100,827, dated March 15, 1870.

IMPROVEMENT IN HORSE-POKES.

The Schedule referred to in these Letters Patent and making part of the same

I, GEORGE WHITBECK, of Phelps, in the county of Ontario, and State of New York, have invented a certain new and useful Improvement in Horse-Pokes, of which the following is a specification.

My improvement relates to that class of horse and cattle-pokes in which a sharp-pointed instrument is employed for pricking the animal when making an attempt to leap over a fence.

The improvement consists in the construction and arrangement of the device substantially as hereinafter described.

In the drawings—

Figures 2, 4:
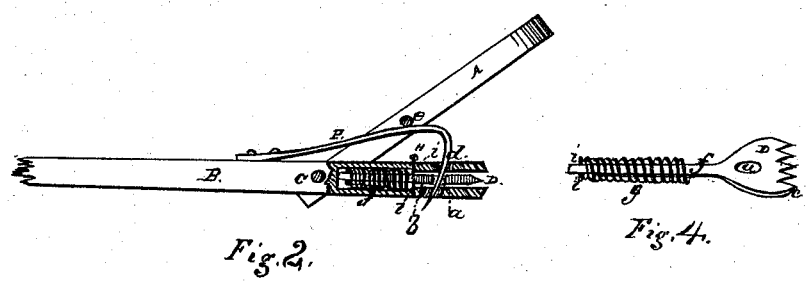
Figure 3:
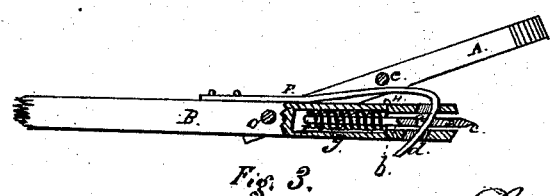

Figure 1 is a perspective view of my improved poke;

Figure 2, a sectional view of the same, with the spring-bearing elevated and the spear withdrawn into the mortise in the end of the poke;

Figure 3, a similar view, with the spring-bearing depressed and the spear forced part way out, as in the act of pricking the animal; and Figure 4, a perspective view of the spear detached.

A indicates the yoke which rests over the animal's neck, and

B is the poke or stale which is pivoted or jointed to the yoke at $c$.

In the upper end of the stale B is formed a mortise or socket, $b$, which receives the spear or prick D.

I make the spear D substantially of the form shown in fig. 4, and with the outer end provided with sharp points or teeth $c\ c$.

To the stale B, near its upper end, I secure a spring-bearing, F, with its free end bent down in the inclined position shown, so as to project through the end of the stale, the inclined portion $d$ resting obliquely through the elongated slot $a$ of the spear D.

A bar or bearing, $e$, extends across the yoke A from side to side, and rests over the spring F.

As the stale B is pressed down by the animal approaching the fence, in the attempt to leap over, the stale, turning on the pivot $c$, forces the spring F against the bar $e$, and depresses the inclined or obliquely-projecting portion $d$ through the slot or bearing $a$ of the spear, as shown in fig. 3, by which action it will be perceived that the spear D is thrown out against the animal's breast.

The stem or shank $f$ of the spear D is provided with a spiral spring, $g$, which rests against the pins $i\ i$, and serves to draw the spear back into the socket $b$, when forced out by the action of the obliquely-projecting portion $d$ of the spring F.

I am aware that pokes for horses and cattle have before been patented, in which pricks or spurs have been employed for pricking the animal when attempting to leap over a fence, and such, broadly, I do not claim; but

What I claim as my invention is—

The construction and arrangement of the device, consisting of the spear D, resting in the socket or mortise $b$, and provided with the slot $a$ and spiral spring $g$, in combination with the yoke A, stale B, and the spring F, provided with the inclined or obliquely-projecting portion $d$, operating substantially as and for the purpose herein set forth.

In testimony whereof I hereunto sign my name in the presence of two subscribing witnesses.

GEO. WHITBECK.

Witnesses:
J. A. DAVIS,
FRED. A. HATCH.